Feb. 11, 1947. P. DUNSHEATH 2,415,488
FLOAT
Filed Nov. 26, 1943 2 Sheets-Sheet 1
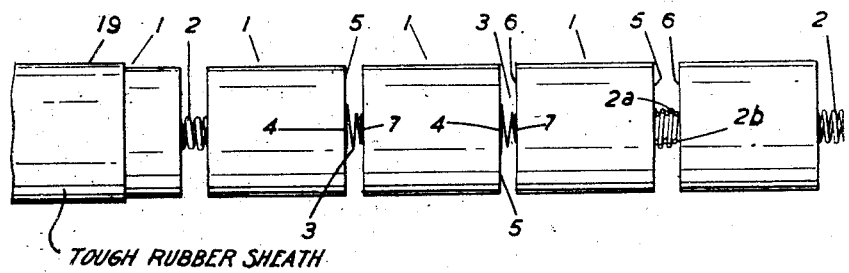
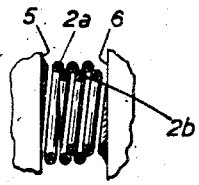
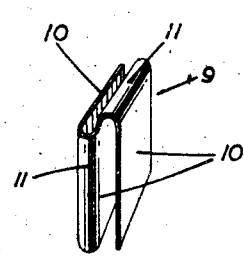 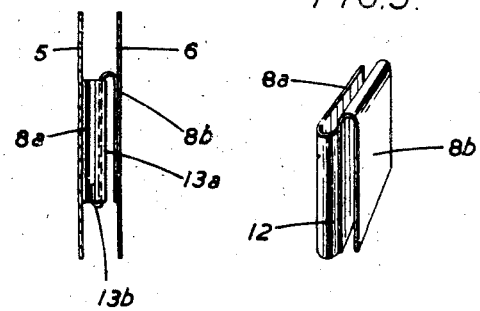
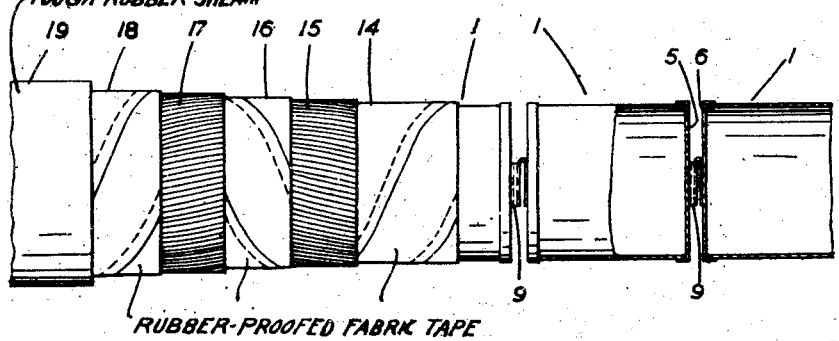
Inventor:
Percy Dunsheath,
By
Stebbins, Blenko & Webb,
Attorneys Feb. 11, 1947.  P. DUNSHEATH  2,415,488
FLOAT
Filed Nov. 26, 1943  2 Sheets-Sheet 2
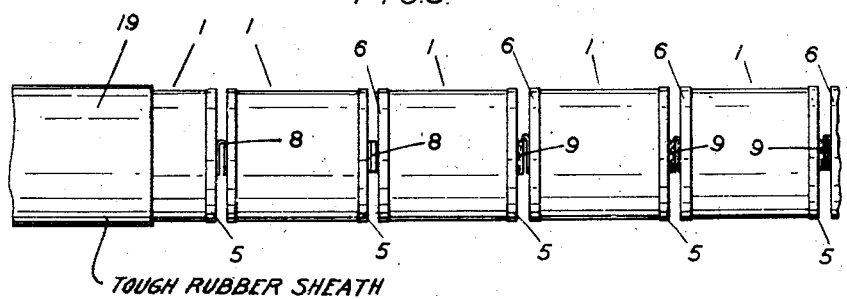
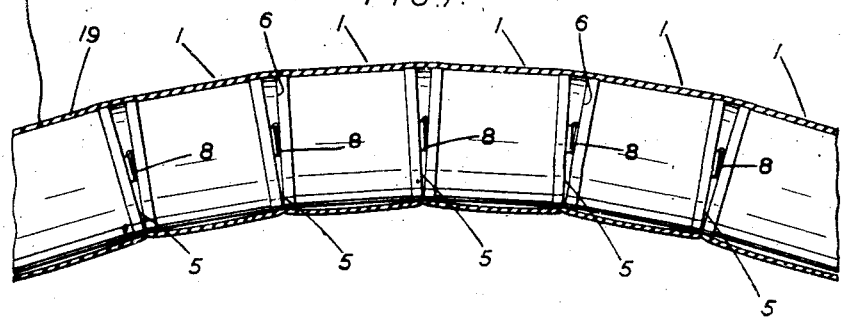

Patented Feb. 11, 1947

2,415,488

UNITED STATES PATENT OFFICE 2,415,488

FLOAT

Percy Dunsheath, Abinger, England, assignor to W. T. Henley's Telegraph Works Company Limited, Westcott, Dorking, England, a British company Application November 26, 1943, Serial No. 511,848
In Great Britain November 28, 1942

8 Claims. (Cl. 9—8)

1

This invention relates to long flexible floats for use in the manufacture of water-buoyant electric cable or for other purposes. In such cable the long flexible float generally forms a core about which are disposed one or more layers of wires constituting the cable conductor, which is usually provided with a flexible waterproof covering. For some purposes it is essential that the cable should possess a high resistance to compression in a lateral direction and yet be flexible lengthwise to permit of frequent reeling and unreeling without damage. These requirements necessitate a core that is rigid in a lateral direction but locally compressible in a longitudinal direction. Hitherto local compressibility has been obtained by making the core in part of resilient material, generally soft rubber, and in part of relatively rigid material, for instance, ebonite, wood or metal. By the present invention we provide an alternative form of flexible float in which the need for rubber or like resilient material may be avoided.

In accordance with this invention we build up a float of a series of laterally rigid cellular elements coupled to one another along the axis of the float, that is, at points lying on or in the region of the axis, by a flexible coupling member which tends to hold them in spaced relationship and to maintain them in axial alignment with one another but which, when the float is subjected to bending forces, permits successive elements to approach one another and take up positions with their axes inclined to one another.

The invention will be further described with reference to the accompanying drawings, wherein—

Figure 1 is an elevation of a short length of a float constructed in accordance with our invention, part of the covering being cut away to expose the interior, Figure 2 is a fragmental view, on a larger scale, of one of the several forms of coupling member shown in Figure 1, Figure 3 is an elevation of a short length of a float of a form differing slightly from that shown in Figure 1, Figure 4 is a perspective view, on an enlarged scale as compared with Figure 3, of one of the two forms of coupling member employed in the float shown in Figure 3, Figure 5 is a perspective view, on the same scale as that of Figure 4, showing an alternative form of coupling member, Figure 6 is a fragmental elevation of the end walls of two successive cellular members connected together by a modified form of the coupling member shown in Figure 5, Figure 7 is a view partly in section of a short length of a float of the form shown in Figure 3 when bent, and Figure 8 is a view of the stepped end of a length of cable embodying a float constructed in accordance with the invention.

The float shown in Figure 1 of the drawings comprises a number of laterally rigid cellular elements 1 coupled together end to end along their respective axes. The coupling members which tend to hold the elements 1 apart and to maintain them in axial alignment with one another but, during bending of the float, permit successive elements to approach one another and take up mutually inclined positions, are compressible springs of which the ends of each are secured to the adjacent end walls of two successive elements. The springs will generally, but not necessarily, be of metal. The springs may be helical springs 2, as shown in Figure 1 between the first and second elements from the left, or they may be helicoidal springs 3, as shown in Figure 1 between the second and third, and third and fourth, elements from the left, in which case, they may each be formed by making a spirally extending slot in a disc of sheet metal, for instance, tin-plate or brass, and pulling the centre of the metal spiral so formed out of the original plane of the disc. The base 4 of the spiral will then be secured to one end wall 5 of one element and the centre 7 of the spiral to the adjacent end wall 6 of the next element.

An alternative form of compressible spring coupling member is shown in Figure 3 between the first and second, and second and third, cellular elements from the left. It comprises a length of metal strip 8 bent into U-shape to permit the elements, to which the parts forming the limbs of the U are attached, to be readily inclined to one another to a limited extent in one axial plane and also to move axially towards one another to a limited but adequate extent. With springs of this form, it is advisable for successive springs to be relatively angularly displaced about the axis of the float by a large angle, preferably a right angle, as shown in Figure 3, to impart to the core longitudinal flexibility in all directions. To avoid this precaution, springs 9 of the form shown in Figure 3 between the third, fourth, fifth and sixth elements from the left may be used. As will be more clearly seen from the enlarged Figure 4, this spring 9 comprises three overlying but mutually spaced flat portions 10, one edge of the middle portion and one edge of one of the outer portions of which are united by a semi-cylindrical portion 11, and a second edge of the middle portion (which lies at a large angle, preferably a right angle to the first edge) and one edge of the other of the outer portions of which are united by a second semi-cylindrical portion 11.

To facilitate assembly of the cellular elements to form the long flexible float, the spring between each two elements may comprise two separable portions, one secured on the end wall of one member and the other on the end wall of the next. In the case of a helical spring, the dimensions of the two portions 2a and 2b are such that the two can be readily coupled together by screwing the one into the other, as is shown in Figure 1 between the fourth and fifth elements from the left and in the enlarged Figure 2, care being taken that the two parts do not interengage throughout their entire lengths and so reduce compressibility to a negligible quantity. In the case of bent strip form of spring, of the kind comprising three overlying but mutually spaced flat portions, united by semi-cylindrical portions, as above described, the middle portion may be built up of two parts which are attached together after the outer portions have been secured to the end walls of the two elements to be connected. For instance, the spring may be formed of two U-shaped parts, one limb of one part being secured to one end wall of one cellular element and one limb of the other being secured to the adjacent end wall of the next element, either during or after manufacture of the elements, which are spring-coupled by securing together the two abutting limbs of the two U-shaped parts, preferably with one strip rotated about the float axis through a right angle relative to the other, as shown in Figure 5. The abutting limbs may be secured by soldering as indicated at 12 in Figure 5 or the top of each of the two abutting limbs may be bent outwardly and back upon itself as shown in Figure 6 to form two hooked portions 13a and 13b, which each receive and grip one margin of the limb of the other U-shaped piece and so couple the two elements together. This latter form of coupling can only be broken by a lateral displacement of one element with respect to the other. It will be obvious that such a movement cannot take place once a covering of any form has been applied to the float.

The cellular elements may be bodies of cellular material, for instance, hard expanded rubber or cork but preferably they are in the form of closed hollow containers with circumferential walls of metal, plywood or a tough plastic. One or both ends walls of each container may be of the same material as the circumferential wall or of different material. If the end walls of the containers are of metal they may be sufficiently thin to give additional flexibility to the float.

The mode of attachment of the coupling member to the end walls of the containers or other cellular elements may vary according to the nature of the end walls. With hollow containers with end walls of tin-plate, or sheet brass, and coupling member of metal, for instance, tin-plate, or brass, the member may be readily secured to them by soldering. Where the end walls of the containers are of lacquered sheet iron or steel or of sheet aluminum, coupling members of metal may readily be secured by welding, for instance, electric spot-welding, or by riveting or by lugs on the member which are passed through slots in the end wall and deformed. It will be appreciated that in some cases it may be necessary to secure the coupling member to the end walls before completing manufacture of the containers themselves. With elements of hard expanded rubber, for instance, a coupling member comprising two portions will generally be used, each of which is moulded in the end of one of the two elements to be coupled.

The improved float is particularly advantageous in cases where it is desirable or necessary to use a float enclosed in a sheath of tough rubber or other material that is not easily stretched. As will be seen from Figure 7, when the float is bent, the tough rubber sheath 19, in which the coupled cellular elements 1 are enclosed, will not stretch on the outside of the bend to any appreciable extent, but will crumple on the inside of the bend. Consequently the clearance between the radially outer parts of two successive elements remains practically unchanged in the region of the outside of the bend but is very much reduced in the region of the inside of the bend. Hence, the clearance between the central parts of successive containers is reduced by the bending of the covered float. The longitudinally compressible coupling members 9 permit of this reduction being made without making provision for the distortion of the end walls of the elements. It will be apparent, therefore, that the improved flexible float constructed in accordance with the present invention provides a particularly satisfactory buoyant core for a buoyant electric cable. An example of such a cable is shown in Figure 8. In this example, the elements 1 of the buoyant core are in the form of hollow containers made entirely of metal, for instance, of tin-plate or sheet brass and the coupling members 9 are of the form shown in Figure 4, though members of the form shown in Figure 5 are sometimes to be preferred. Over the containers is a lapped covering 14 of rubber-proofed fabric tape which forms a bedding for a layer 15 of helically applied wires. Over this layer is a further layer 16 of rubber-proofed fabric tape and on that a second layer 17 of wires laid up with a reverse lay. Over the outer layer of wires 17 is a further wrapping 18 of proofed tape and over all a tough rubber sheath 19.

Where all the elements and coupling members are entirely of metal, the float forms a continuous electric conductor which, if the float forms part of a buoyant cable, is or can be connected in parallel with the main conductor which it supports, thus increasing the conductivity of a cable of given overall diameter or, alternatively, permitting a reduction in size of the main conductor and hence in the weight and overall size of a cable of given conductivity.

In many cases it will be advantageous for the float to be built up of identical cellular elements which are coupled together by coupling members of the same form. In some cases, however, it may be an advantage for one part of the float to be built up of elements of one form and for another part or parts to be built up of elements of another form or forms. In such cases, and also in other cases, it may be desirable to employ different forms of flexible coupling members in different parts of the float.

What I claim as my invention is:

1. A long flexible float comprising a series of laterally rigid cellular elements and means for coupling said elements together along the axis of the float, said means comprising a plurality of discrete, resilient, flexible coupling members which tend to hold the said elements in spaced relationship and to maintain them in axial alignment, but which when the float is subjected to bending forces, permit successive elements to approach one another and take up positions with their axes inclined to one another.

2. A long flexible float comprising a number of laterally rigid cellular elements and means for coupling said elements together along the axis of the float, said means comprising a number of compressible springs, disposed one between each two successive cellular elements with its ends secured to the adjacent walls of the two elements.

3. A long flexible float comprising a number of laterally rigid cellular elements and compressible springs coupling together the contiguous walls of said elements along the axis of the float, at least some of said springs being helical wire springs.

4. A long flexible float comprising a number of laterally rigid cellular elements and compressible springs coupling together the contiguous walls of said elements along the axis of the float, at least some of said springs being helicoidal springs of sheet metal.

5. A long flexible float comprising a series of laterally rigid cellular elements and compressible spring couplings coupling together the said elements along the axis of the float, at least some of said couplings each comprising a pair of helical wire springs one of which pair is screwed into the end of the other and attached at one end to the central part of one end wall of one of said elements and the other of which pair is attached at one end to the central part of the contiguous end wall of the next element of the series.

6. A long flexible float comprising a series of laterally rigid cellular elements and compressible spring couplings coupling together said elements along the axis of the float, at least some of said couplings being U-shaped strips of metal of which the parts forming the limbs of the U are attached to the central parts of the contiguous end walls of two successive elements of said series, successive couplings being relatively angularly displaced about the axis of the float by a large angle, preferably a right angle.

7. A long flexible float comprising a series of laterally rigid cellular elements and compressible spring couplings coupling together said elements along the axis of the float, at least some of said couplings comprising three overlying but mutually spaced flat portions, of which one edge of the middle portion is united by a semi-cylindrical portion to one edge of one of the outer portions, and a second edge of the middle portion lying at a large angle, preferably a right angle, to the first edge, is united by a second semi-cylindrical portion to one edge of the other of the outer portions.

8. A long flexible float as specified in claim 7, wherein at least some of the spring couplings are each built up of two superposed U-shaped members, the neighbouring limbs of which are secured together to form the middle portion of the complete coupling.

PERCY DUNSHEATH.

REFERENCES CITED

The following references are of record in the file of this patent:

UNITED STATES PATENTS

| Number | Name | Date |
| --- | --- | --- |
| 1,667,510 | Coe | Apr. 27, 1928 |
| 2,352,158 | Bishop | June 27, 1944 |
| 411,161 | Maynard | Sept. 17, 1889 |
| 292,281 | Brewster | Jan. 22, 1884 |
| 1,403,326 | Walters | Jan. 10, 1922 |
| 1,667,510 | Coe | Apr. 24, 1928 |
| 1,810,079 | Jennison | June 16, 1931 |
| 1,843,452 | Jennison | Feb. 2, 1932 |
| 2,048,811 | Peirce | July 28, 1936 |

FOREIGN PATENTS

| Number | Country | Date |
| --- | --- | --- |
| 312,464 | British | May 30, 1929 |